(12) United States Patent
Forster

(10) Patent No.: US 8,847,764 B2
(45) Date of Patent: *Sep. 30, 2014

(54) RFID SYSTEM WITH DISTRIBUTED READ STRUCTURE

(75) Inventor: Ian J. Forster, Essex (GB)

(73) Assignee: Avery Dennison Corporation, Glendale, CA (US)

( * ) Notice: Subject to any disclaimer, the term of this patent is extended or adjusted under 35 U.S.C. 154(b) by 725 days.

This patent is subject to a terminal disclaimer.

(21) Appl. No.: 11/950,924

(22) Filed: Dec. 5, 2007

(65) Prior Publication Data

US 2009/0146783 A1 Jun. 11, 2009

(51) Int. Cl.
- G08B 13/14 (2006.01)
- G08B 1/08 (2006.01)
- G08B 5/22 (2006.01)
- H04Q 1/30 (2006.01)
- G06K 7/10 (2006.01)

(52) U.S. Cl.
CPC ........ *G06K 7/10178* (2013.01); *G06K 7/10336* (2013.01)
USPC .................. 340/572.7; 340/7.37; 340/539.21

(58) Field of Classification Search
CPC ..... H01Q 7/00; H01Q 1/2225; G06K 7/0008; G06K 19/0723; G06K 19/07749; H01F 38/14; H02J 17/00; G08B 13/1427; G08B 21/0247; G08B 25/10; G08B 21/0227; G08B 3/1066; G08B 6/00; G08B 1/1607; B60R 25/04; H04W 88/022; H04W 52/02; H04B 1/1607; G06Q 10/08; G06Q 10/087
USPC ................ 340/10.1, 7.37, 539.21, 10.34, 5.8, 340/572.1, 572.7, 572.8; 235/385, 451; 705/1.1, 23
See application file for complete search history.

(56) References Cited

U.S. PATENT DOCUMENTS

| | | | |
|---|---|---|---|
| 5,565,858 A | 10/1996 | Guthrie | |
| 5,822,685 A | 10/1998 | Forster | |
| 5,963,134 A | 10/1999 | Bowers et al. | |
| 6,046,668 A | 4/2000 | Forster | |

(Continued)

FOREIGN PATENT DOCUMENTS

GB 2 360 422 9/2001

OTHER PUBLICATIONS

International Search Report and Written Opinion of the International Searching Authority issued in PCT/US2008/085101 dated Mar. 26, 2009.

(Continued)

*Primary Examiner* — Omer S Khan
(74) *Attorney, Agent, or Firm* — Avery Dennison Corporation

(57) ABSTRACT

A radio frequency identification (RFID) system includes a portable RFID reader, and a read infrastructure that includes a distributed read structure, which may be part of a display (such as a shelf) for holding objects. The read structure is used to couple the RFID reader to RFID devices (tabs and/or labels) on or near the structure. The RFID reader and the read structure communicate in a near field or proximity region communication, without any use of a direct ohmic electrical connection. The RFID reader may have an antenna that is configured for near field or proximity communication with a coupler of the read infrastructure. The RFID reader may also have a separate antenna for use in far field communication. The RFID reader may be able to obtain information more efficiently in the near field or proximity mode, allowing information to be received faster and with greater reliability.

17 Claims, 3 Drawing Sheets

(56) References Cited

U.S. PATENT DOCUMENTS

| | | |
|---|---|---|
| 6,232,870 B1 | 5/2001 | Garber et al. |
| 6,281,797 B1 | 8/2001 | Forster et al. |
| 6,369,772 B1 | 4/2002 | Forster |
| 6,456,225 B1 | 9/2002 | Forster |
| 6,480,062 B1 | 11/2002 | Forster |
| 6,483,473 B1 | 11/2002 | King et al. |
| 6,501,435 B1 | 12/2002 | King et al. |
| 6,580,357 B1 | 6/2003 | Forster et al. |
| 6,628,237 B1 | 9/2003 | Forster et al. |
| 6,630,910 B2 | 10/2003 | Forster et al. |
| 6,642,897 B2 | 11/2003 | Forster et al. |
| 6,646,555 B1 | 11/2003 | Forster et al. |
| 6,720,865 B1 | 4/2004 | Forster et al. |
| 6,734,796 B2 | 5/2004 | Forster et al. |
| 6,744,367 B1 | 6/2004 | Forster |
| 6,778,088 B1 | 8/2004 | Forster |
| 6,799,027 B1 | 9/2004 | Forster |
| 6,806,842 B2 | 10/2004 | King et al. |
| 6,828,941 B2 | 12/2004 | King et al. |
| 6,847,912 B2 | 1/2005 | Forster |
| 6,853,345 B2 | 2/2005 | King et al. |
| 6,853,347 B2 | 2/2005 | Forster et al. |
| 6,894,616 B1 | 5/2005 | Forster |
| 6,895,226 B1 | 5/2005 | Forster et al. |
| 6,895,655 B2 | 5/2005 | Forster et al. |
| 6,903,704 B2 | 6/2005 | Forster et al. |
| 6,914,562 B2 | 7/2005 | Forster |
| 6,975,834 B1 | 12/2005 | Forster |
| 6,985,119 B2 | 1/2006 | Forster et al. |
| 7,046,122 B1 | 5/2006 | Forster |
| 7,046,957 B1 | 5/2006 | Farr et al. |
| 7,055,754 B2 | 6/2006 | Forster |
| 7,057,562 B2 | 6/2006 | Forster et al. |
| 7,059,518 B2 | 6/2006 | Forster |
| 7,088,248 B2 | 8/2006 | Forster |
| 7,093,345 B2 | 8/2006 | Forster et al. |
| 7,098,850 B2 | 8/2006 | King et al. |
| 7,102,520 B2 | 9/2006 | Liu et al. |
| 7,109,867 B2 | 9/2006 | Forster |
| 7,123,204 B2 | 10/2006 | Forster et al. |
| 7,142,120 B2 | 11/2006 | Charych et al. |
| 7,154,283 B1 | 12/2006 | Weakley et al. |
| 7,158,033 B2 | 1/2007 | Forster |
| 7,158,037 B2 | 1/2007 | Forster et al. |
| 7,164,353 B2 | 1/2007 | Puleston et al. |
| 7,170,415 B2 | 1/2007 | Forster |
| 7,180,423 B2 | 2/2007 | Forster et al. |
| 7,190,319 B2 | 3/2007 | Forster et al. |
| 7,191,507 B2 | 3/2007 | Forster et al. |
| 7,193,563 B2 | 3/2007 | King et al. |
| 7,212,127 B2 | 5/2007 | Jacober et al. |
| 7,224,273 B2 | 5/2007 | Forster |
| 7,224,280 B2 | 5/2007 | Ferguson et al. |
| 7,225,992 B2 | 6/2007 | Forster |
| 7,233,250 B2 | 6/2007 | Forster |
| 7,234,642 B2 | 6/2007 | Forster |
| 7,239,287 B2 | 7/2007 | Forster |
| 7,273,173 B2 | 9/2007 | Forster |
| 7,275,040 B2 | 9/2007 | Forster et al. |
| 7,292,148 B2 | 11/2007 | Forster |
| 7,295,117 B2 | 11/2007 | Forster et al. |
| 7,298,266 B2 | 11/2007 | Forster |
| 7,298,267 B2 | 11/2007 | Forster |
| 7,298,330 B2 | 11/2007 | Forster et al. |
| 7,298,343 B2 | 11/2007 | Forster et al. |
| 7,306,162 B2 | 12/2007 | Forster |
| 7,307,527 B2 | 12/2007 | Forster |
| 7,640,185 B1 * | 12/2009 | Giordano et al. ............... 705/23 |
| 2003/0128100 A1 * | 7/2003 | Burkhardt et al. ............. 340/5.8 |
| 2006/0103532 A1 | 5/2006 | Van Fleet |
| 2007/0001809 A1 | 1/2007 | Kodukula et al. |
| 2007/0222609 A1 * | 9/2007 | Duron et al. ............... 340/572.7 |

OTHER PUBLICATIONS

Capps, Charles, "Near field or far field?", <http://www.ednmag.com., 2001, pp. 95-102.

* cited by examiner

US 8,847,764 B2

RFID SYSTEM WITH DISTRIBUTED READ STRUCTURE

BACKGROUND OF THE INVENTION

1. Field of the Invention

The invention is in the field of devices and methods for radio frequency identification (RFID).

2. Description of the Related Art

Radio frequency identification (RFID) tags and labels (collectively referred to herein as "devices") are widely used to associate an object with an identification code. RFID devices generally have a combination of antennas and analog and/or digital electronics, which may include for example communications electronics, data memory, and control logic. For example, RFID tags are used in conjunction with security locks in cars, for access control to buildings, and for tracking inventory and parcels.

As noted above, RFID devices are generally categorized as labels or tags. RFID labels are RFID devices that are adhesively or otherwise have a surface attached directly to objects. RFID tags, in contrast, are secured to objects by other means, for example by use of a plastic fastener, string or other fastening means.

RFID devices include active tags and labels, which include a power source, and passive tags and labels, which do not. In the case of passive devices, in order to retrieve the information from the chip, a "base station" or "reader" sends an excitation signal to the RFID tag or label. The excitation signal energizes the tag or label, and the RFID circuitry transmits the stored information back to the reader. The RFID reader receives and decodes the information from the RFID tag. In general, RFID tags can retain and transmit enough information to uniquely identify individuals, packages, inventory and the like. RFID tags and labels also can be characterized as those to which information is written only once (although the information may be read repeatedly), and those to which information may be written to repeatedly during use. For example, RFID tags may store environmental data (that may be detected by an associated sensor), logistical histories, state data, etc.

With increased use of RFID devices it becomes increasingly important to improve communication with such devices. Therefore it will be appreciated that improvements are possible for RFID devices and systems for communicating with such devices.

SUMMARY OF THE INVENTION

According to an aspect of the invention, a radio frequency identification (RFID) reader communicates by proximity coupling or near field coupling, with a coupler that is connected to a distributed read structure.

According to another aspect of the invention, an RFID system includes a portable RFID reader and a distributed read structure, wherein the RFID reader and the distributed read structure communicate by proximity coupling or near field coupling.

According to yet another aspect of the invention, a portable RFID includes separate antennas for far field and proximity or near field communication.

According to still another aspect of the invention, a read infrastructure for radio frequency identification (RFID) devices includes: a distributed read structure for near field coupling with RFID devices; and a coupler, electrically connected to the read structure, for proximity coupling to an RFID reader.

According to a further aspect of the invention, a method of reading radio frequency identification (RFID) devices includes the steps of: operatively coupling the RFID devices to a distributed read structure of a read infrastructure; operatively coupling an RFID reader to a coupler of the read infrastructure; and reading the RFID devices through the read infrastructure to the RFID reader.

According to a still further aspect of the invention, a method of taking inventory includes the steps of: providing objects with RFID devices in or on a display device having a read infrastructure; placing an RFID reader in proximity coupling with a coupler of the read infrastructure; and initiating communication between the RFID reader and the RFID devices, through the coupler and through a distributed read structure of the read infrastructure.

According to another aspect of the invention, a point of sale display includes: a display having a plurality of objects disposed thereon, with each of the objects having an RFID device attached thereto; and a read structure for operating in two separate modes. The RFID devices are read through one of the two separate modes.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale.

DETAILED DESCRIPTION

Figure 1:
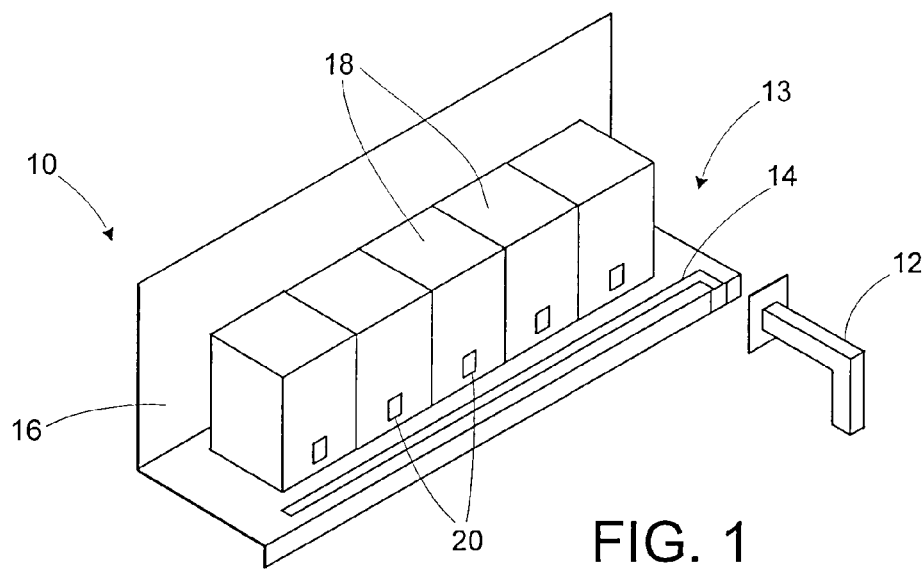
FIG. 1 is an oblique view of an RFID system in accordance with an embodiment of the present invention.

A radio frequency identification (RFID) system includes a portable RFID reader, and a read infrastructure that includes a distributed read structure, which may be part of a display (such as a shelf) for holding objects. The read structure is used to couple the RFID reader to RFID devices (tabs and/or labels) on or near the structure. The RFID reader and the read structure communicate in a proximity or near field communication, without any use of a direct ohmic electrical connection. The RFID reader may also be able to communicate with RFID devices using far field communication. The RFID reader may have an antenna that is configured for proximity or near field communication with a coupler of the read infrastructure. The RFID reader may also have a separate antenna for use in far field communication. Electronics of the RFID reader may select between a near field mode of operation (optimized for near field communication with the coupler of the read structure), and a far field mode of operation for far field communication with individual or multiple RFID devices. The RFID reader may be able to obtain information more efficiently in the proximity or near field mode, allowing information to be received faster and with greater reliability than in far field communication with the individual RFID devices coupled to objects.

The term "far field" is used in contrast to the "near field" that is closer to antenna. Both terms describe the fields around an antenna (or any other electromagnetic radiation source). In a three region model, the far field is where the dominant terms in Maxwell's equation are those proportional to $1/r$, where r is the distance from the antenna (or other radiation source). The near field encompasses a reactive field or Frenel zone, where the dominant terms are proportional to $1/r^3$, and a near radiation field or transition zone, where the dominant terms are proportional to $1/r^2$. The boundary between the near field and the far field is often taken to be (and may be considered herein as) a distance from the antenna equal to $\lambda/2\pi$, where $\lambda$ is the wavelength of the radiation being emitted by the antenna. Further details regarding the boundary between the near field and the far field may be found in Capps, Charles, Near field or far field?, EDN, Aug. 16, 2001, available at www.edn.com/contents/images/150828.pdf.

"Proximity coupling" or "proximity field coupling" occurs at a range that goes beyond near field coupling, beyond the reactive near field and the radiating near field to include a farther region in which sufficient energy may be transferred to operate tags via a distributed read structure. The boundary between the near field and the far field is often taken to be a distance from the antenna equal to $\lambda/2\pi$, where $\lambda$ is the wavelength of the radiation being emitted by the antenna, although it should be realized that sufficient energy is available to operate a RFID device designed to couple via magnetic or electric field coupling at ranges much greater than this depending on the distributed antenna design and power input via the coupler. It is commonly understood that the region where powering via a primarily single field component, retaining the advantageous characteristics of near field coupling, is possible out to approximately 1 wavelength away from the read system. Therefore proximity coupling, as the term is used herein, is defined as extending out to a range of about 1 wavelength of energy emitted, away from the read system.

Although the proximity region as defined herein extends beyond the near field region as defined above, the term "far field" will be used herein at times to refer to the region beyond the proximity region where proximity coupling occurs. Thus "far field," as used herein, thus may refer to either beyond the near field or beyond the proximity field (which includes the near field region, but extends farther than the near field region).

FIG. 1 shows an RFID communication system 10 that includes an RFID reader 12 and a read infrastructure 13 that includes a distributed read structure 14. The read structure 14 may be part of a display device 16, such as a shelf or other point of sale device, that has plural objects 18 on or in it. Each object 18 has an RFID device 20 (tag or label) coupled to it. The RFID reader 12 may be a portable reader, for example being a handheld device or a device on a vehicle, such as a forklift truck.

Figure 2:
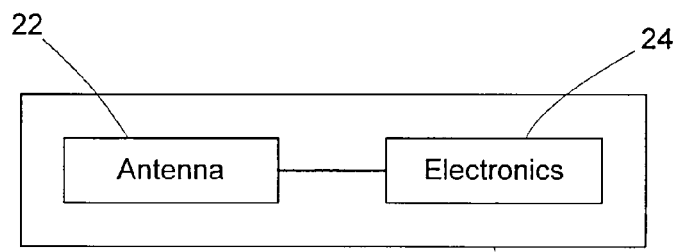
FIG. 2 is a schematic diagram of the RFID reader of the RFID system of FIG. 1.

FIG. 2 shows a schematic diagram of the RFID reader 12. The reader 12 includes one or more antenna 22, and reader electronics 24. The electronics 24 control communication between the reader 12 and other devices, such as the RFID devices 20. The electronics 24 may also include electronics to communicate with external devices other than the RFID devices 20 (FIG. 1). For example the electronics 24 may be configured to communicate with an external computer, to send and/or receive data. The electronics 24 may be embodied in hardware and/or software.

Figure 3:
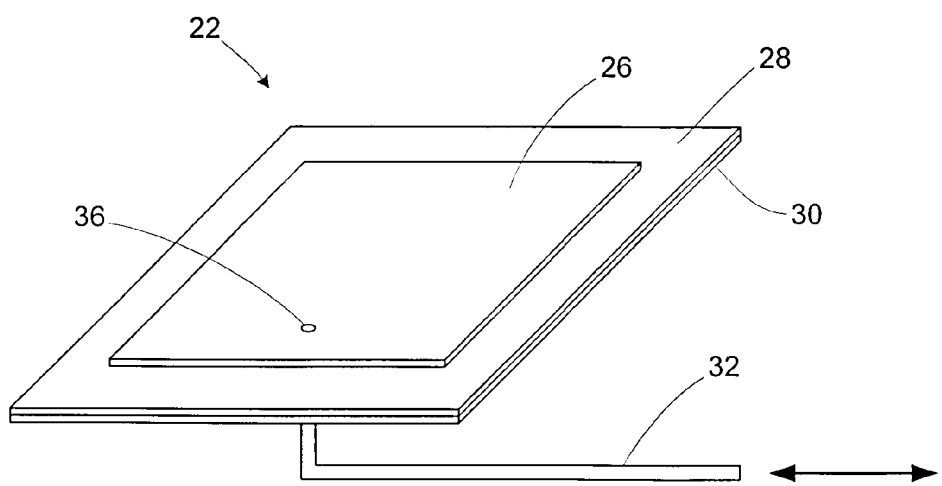
FIG. 3 is an oblique view of the antenna of the RFID reader of FIG. 2.

FIG. 3 shows an example of a configuration of the reader antenna 22. The illustrated example antenna 22 is a half wave patch antenna, with a conductive half wave element 26 on a front surface of a dielectric layer 28. A ground plane 30 is located on the back surface of the dielectric layer 28. A coaxial cable 32 is connected to both the half wave element 26 and the ground plane 30. The cable 32 is connected to the half wave element 26 at a feed point 36 that is offset from the center of the half wave element 26. The amount offset defines the matching impedance to the antenna, which is commonly chosen to be close to 50 ohms.

The reader antenna 22 configuration shown in FIG. 3 has good characteristics for near field or proximity capacitive coupling, although the half wave patch antenna also has good far field characteristics. It will be appreciated that the antenna configuration illustrated is only one configuration of a wide variety of possible configurations for the antenna 22.

Figure 4:
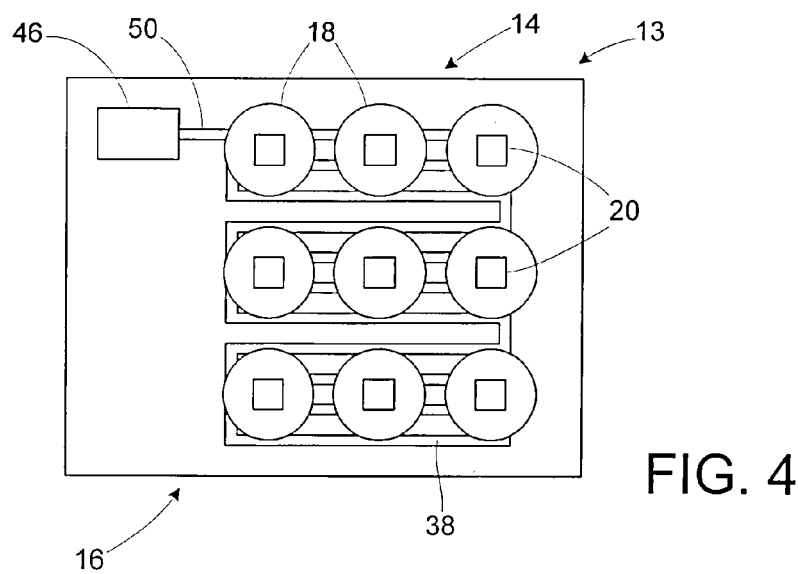
FIG. 4 is a plan view of a display device of the RFID system of FIG. 1.

With reference in addition to FIG. 4, the display device 16 includes the distributed read structure 14 of the read infrastructure 13, for communicating with the RFID devices 20 on the objects 18. The distributed read structure 14 may include a series of conductive strips or patterns 38 on one or more surfaces of the display device 16. The conductive strips or patterns 38 of the distributed read structure 14 may be configured to produce a radio frequency (RF) field between the conductors, for detecting the RFID devices 20. To this end, the conductors 38 may be closely spaced, with a small space between them. This generates an electric field that may be suitable for near field or proximity communication with the RFID devices 20. The RFID devices 20 may be placed in similar positions on the objects 18 so that the RFID devices 20 are in close proximity to the read structure 14 when the objects are placed in or on the display device 16. Examples of distributed read structures are disclosed in U.S. Pat. No. 7,059,518 ("the '518 patent"), the figures and detailed description of which are herein incorporated by reference. It will appreciated that the conductors of the distributed read structure 14 may take any of a wide variety of configurations, only a few of which are disclosed in the '518 patent.

The display device 14 may be any of a variety of devices for holding and/or displaying objects. Examples include a shelf, a clothes rack for hanging clothing on, a rack in a warehouse, and a container such as a bin for holding objects. The objects may be a wide variety of items that may be displayed for sale, for storage, or for other purposes. Examples are far too numerous to list, but might include clothing items, bottles of pharmaceuticals, books, and DVDs or other types of media.

The distributed read structure 14 is connected to a read structure coupler 46 that is used to accomplish near field or proximity coupling with the reader 12. The read structure coupler 46 may be connected to the read structure 14 by a coaxial cable 50 or another suitable conductor. The read structure coupler 46 is configured to interact with the antenna 22 to efficiently accomplish near field or proximity communication between the distributed read structure 14 and the RFID reader 12.

The read infrastructure is described above as a passive device, in that it only acts as a distributed antenna to allow the RFID reader to communicate with the RFID devices. It will be appreciated that alternatively the read infrastructure may have some ability to independently communicate with the RFID devices, and perhaps store information. In such an active or semi-active configuration the read infrastructure may include other suitable parts such as a powered amplifier. Suitable amplifiers would be a single direction unit, which amplifies the RF power in the reader-to-tag link, with a bypass in the tag-to-reader link, or a bi-directional amplifier, which enhances signals in both directions. Of course it will be appreciated that use of amplifiers will require use of power source.

Figure 5:
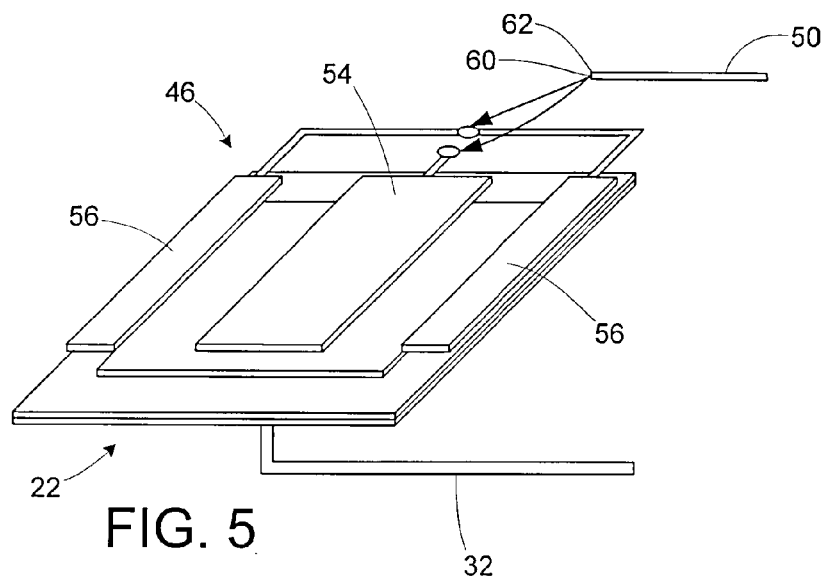
FIG. 5 is an oblique view showing near field coupling between an RFID read antenna and a read infrastructures coupler, both of the RFID system of FIG. 1.

FIG. 5 shows proximity or near field coupling between example configurations of the reader antenna 22 and the read structure coupler 46. The antenna 22 is a half wave antenna configuration that has been described above with regard to FIG. 3. The coupler 46 includes a central active patch or plane 54 of conductive material, flanked by a pair of outer ground patches or planes 56 of conductive material. The central active patch 54 is coupled to a center conductor 60 of the coaxial cable 50. The ground patches 56 are coupled to an outer (ground) conductor 62 of the coaxial cable 50. The coupling is an efficient proximity or near field coupling, a capacitive and/or magnetic dominated coupling, which allows efficient communication between the antenna 22 and the read structure coupler 46. It will be appreciated that the read structure coupler 46 may have any of a wide variety of alternative configurations.

Figure 6:
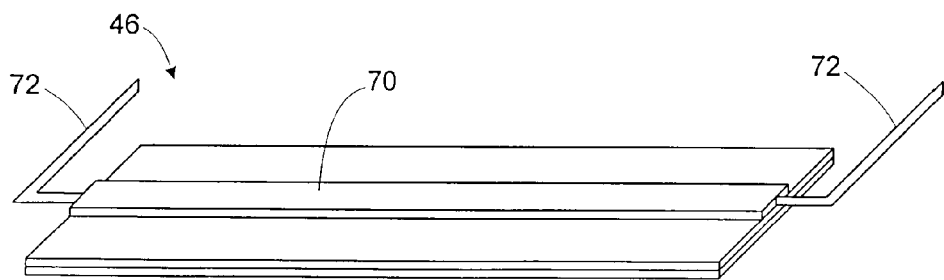
FIG. 6 is an oblique view of an alternate configuration for the read infrastructure coupler of the RFID system of FIG. 1.

FIG. 6 shows an alternative configuration for the read structure coupler 46. The read structure coupler 46 shown in FIG. 6 includes a microstrip 70 or other transmission line with proximity or near field electric and magnetic fields. Interconnections 72 from the sides of the microstrip 70 are used to connect the microstrip 70 to the distributed read structure 14 (FIG. 4). Such a microstrip 70 can be placed along the edge of a shelf, for example. The read antenna 22 (FIG. 3) may be passed along the length of the microstrip 70 to cause proximity or near field communication between the antenna 22 and the microstrip line 70. The configuration shown in FIG. 6 may be placed along segments of a row of shelves, allowing the read structures to be communicated with by moving a reader along the edge of the row of shelves.

Figure 7:
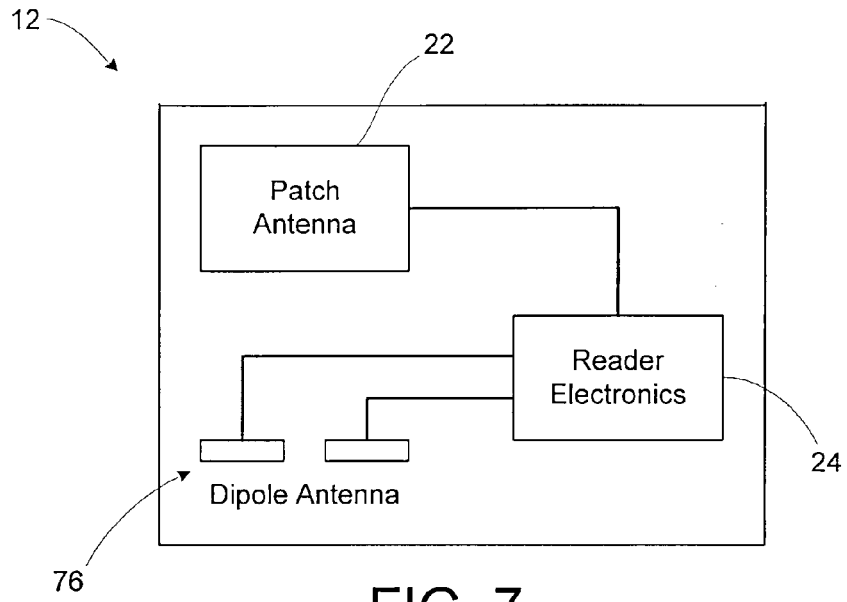
FIG. 7 is a schematic diagram of an alternate configuration of the RFID reader of the RFID system of FIG. 1.

The RFID reader 12 may also be capable of far field communication with the individual RFID devices 20 (FIG. 1). In doing so the RFID reader 12 may utilize the antenna 22 that is also used for proximity or near field communication with the read structure coupler 46. Alternatively, as shown in FIG. 7, the RFID reader 12 may have a pair of antennas 22 and 76. The antenna 22 may be optimized for proximity or near field communication with read structure coupler 46 (FIG. 4). The antenna 76 may be optimized for far field communication directly with the RFID devices 20 (FIG. 1). The antennas 22 and 76 may be different types of antennas, with the illustrated embodiment showing the antenna 22 as a half wave patch antenna and the antenna 76 as a dipole antenna. It will be appreciated that a wide variety of possible antenna types, sizes, and configurations are possible for the antennas 22 and 76.

The reader electronics 24 (FIGS. 2 and 7) may be configured to communicate differently for proximity or near field communication, and far field communication. The differences in communication may include differences in frequency of communication, power utilized, and communication protocols. These differences between proximity communication and far field communication may be present whether the reader has one antenna for both types of communication, or separate antennas for proximity or near field communication, and far field communication.

It will be appreciated that optimizing the communication parameters for proximity and far field operation may improve efficiency for both types of communication. For example, the proximity communication between the reader 12 and the read structure 14 may involve communicating information on all the RFID devices 20 in or on the display 16 in a single coupling between the reader 12 and the read structure 14.

The reader electronics 24 may be configured to detect proximity or near field communication in any of a variety of ways. As one example, a specifically coded RFID device could be coupled to the read structure 14. The reader electronics 24 could be configured to shift into proximity or near field mode, suitable for proximity or near field communication, when information regarding the specifically coded RFID tag is transmitted to the reader 12. In addition, the specifically coded RFID tag may be used to send other information, such as identifying the location of the display device 16.

With regard to the dual antenna reader 12 of FIG. 7, another way is possible of selecting between proximity or near field mode, and far field mode. The reader 12 may be configured to periodically transmit on both of the antennas 22 and 76 (FIG. 6), and to utilize the antenna 22 and 76 with the lowest return loss.

Alternatively, if the far field antenna 76 exceeds has a return loss that exceeds a fixed level, this may be taken as an indication that the reader 12 is in proximity to a proximity or near field structure (such as the read structure coupler 46). In such a situation the reader 12 may change its read parameters to those of the proximity or near field mode.

Figure 8:
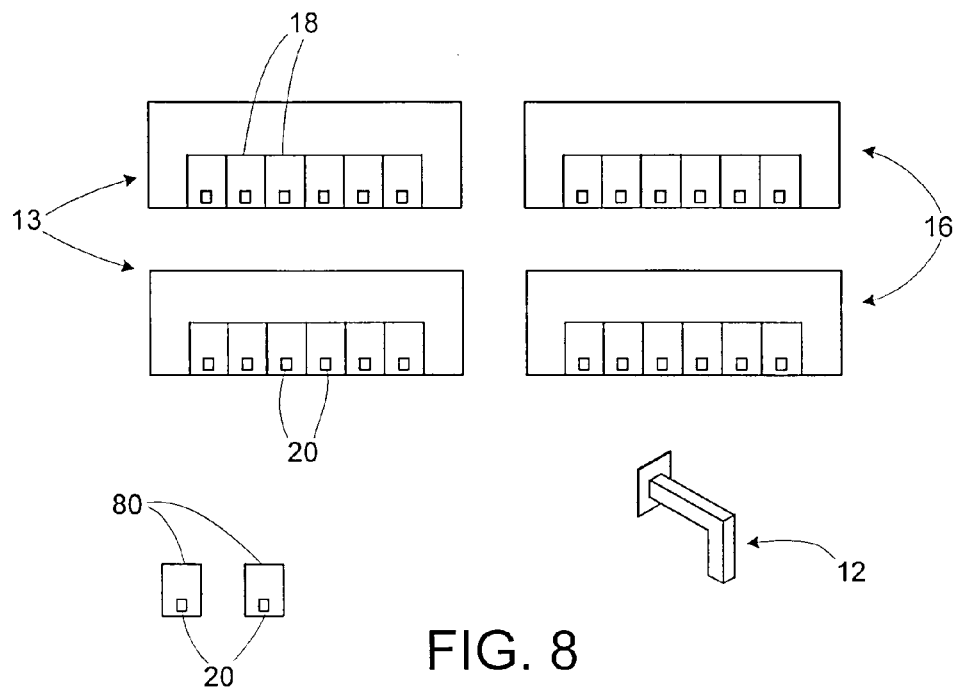
FIG. 8 is an oblique view illustrating RFID systems used for an inventory system in accordance with an embodiment of the present invention.

FIG. 8 illustrates use of the system as part of an inventory system, such as in a store. The RFID reader 12 is coupled to successively to read infrastructures 13 that are parts of display devices 16, such as shelves. This allows communication with RFID devices 20 on the objects 18 that are on the shelves. The reader 12 may also communicate with other objects 80 that are not on the display devices 16, through far field coupling.

It will be appreciated that the RFID systems described above, with the various configurations of the RFID reader and the distributed read system, allows more efficient communication of information from individual RFID devices. The information on the RFID devices may be passed efficiently from the distributed read system to a portable RFID reader using proximity or near field coupling, while still allowing for independent far field coupling using the same RFID reader.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A system for reading radio frequency identification (RFID) devices, comprising:
a distributed read structure coupled to a read structure coupler for proximity coupling with RFID devices within one wavelength of radiation emitted by the read structure;
the read structure coupler including one of i) a central active patch or plane of conductive material flanked by a pair of outer ground patches or planes of conductive material or ii) a microstrip or other transmission line; and
wherein an RFID reader having an antenna, in a near field mode of operation, can couple with the RFID device through the read structure coupler and the read structure, and
wherein the RFID reader, in a far field mode of operation, can couple with the RFID device independent of the read structure coupler and the read structure such that the RFID reader utilizes the antenna for both the near field and far field mode,
wherein the RFID reader selects between the near field mode of operation and the far field mode of operation by periodically transmitting in each mode of operation and selecting the mode of operation with the lowest return loss and if the antenna, when utilized in far field mode, has a return loss that exceeds a fixed level, the RFID reader may select the near field mode of operation and
wherein communication between the RFID reader and the read structures involves communicating information on all RFID devices in a single coupling between the RFID reader and the read structure.

2. The system of claim 1, further comprises a display device.

3. The system of claim 2, wherein the display device further includes a shelf with at least part of the distributed read structure thereupon.

4. The system of claim 3, wherein at least some of the RFID devices are attached to respective objects that are on or in the display device.

5. The system of claim 1, wherein the RFID reader includes:
electronics coupled to the antenna; and
wherein the electronics include electronics for operating the RFID reader in two separate modes:
the near field mode in which the RFID reader communicates by proximity coupling; and
wherein the RFID reader communicates in the far field mode by far field coupling.

6. The system of claim 1, wherein the antenna is a patch antenna.

7. The system of claim 1, wherein the RFID reader is a portable RFID reader.

8. The system of claim 1, wherein the read structure further includes conductive patterns that generate electrical fields between the conductive patterns for proximity communication with the RFID devices.

9. The system of claim 1, wherein the read structure coupler further includes multiple conductive plates.

10. A method of reading radio frequency identification (RFID) devices, the method comprising:
operatively coupling the RFID devices to a distributed read structure of a read infrastructure in which the read infrastructure includes an amplifier;
operatively coupling an RFID reader to a coupler of the read infrastructure;
reading the RFID devices through an antenna of the RFID reader wherein the RFID reader, in a near field mode of operation, can couple with the RFID device through the coupler and the read structure, and the RFID reader, in a far field mode of operation, can couple with the RFID device independent of the coupler and the read structure such that the RFID reader utilizes the antenna for both the near field and far field mode; and
wherein the RFID reader selects between the near field mode of operation and the far field mode of operation by periodically transmitting in each mode of operation and selecting the mode of operation with the lowest return loss, and if the antenna of the RFID reader, when utilized in far field mode, has a return loss that exceeds a fixed level, the RFID reader may select the near field mode of operation;
wherein communication between the RFID reader and the read structures involves communicating information on all RFID devices in a single coupling between the RFID reader and the read structure.

11. The method of claim 10, wherein the operative coupling between the RFID devices and the distributed read structure is proximity coupling.

12. The method of claim 10, wherein the operative coupling between the RFID reader and the coupler is proximity coupling.

13. The method of claim 10,
wherein the RFID reader is a portable RFID reader; and
wherein the operatively coupling the RFID reader to the coupler includes moving the antenna of the RFID reader into proximity coupling with the coupler.

14. The method of claim 10,
wherein the near field mode differs from the far field mode of the RFID reader in one or more of frequency of communication, power utilized, and communication protocol.

15. The method of claim 10,
wherein the read infrastructure further comprises a display device; and
wherein the RFID devices are mechanically attached to respective objects that are on or in the display device.

16. A method of taking inventory, the method comprising:
providing objects with RFID devices in or on a display device having a read infrastructure;
placing a dual antenna of an RFID reader in proximity coupling with a coupler of the read infrastructure; and
initiating communication between the RFID reader and the RFID devices, through the coupler and through a distributed read structure of the read infrastructure wherein the RFID reader, in a near field mode of operation, can couple with the RFID device through the coupler and the read structure, and wherein the RFID reader, in a far field mode of operation, can couple with the RFID device independent of the coupler and the read structure such that the RFID reader utilizes the dual antenna for both the near field and far field mode; and
wherein the RFID reader selects between the near field mode of operation and the far field mode of operation by periodically transmitting in each mode of operation and selecting the mode of operation with the lowest return loss and if the dual antenna of the RFID reader, when utilized in far field mode, has a return loss that exceeds a fixed level, the RFID reader may select the near field mode of operation;

wherein communication between the RFID reader and the read structures involves communicating information on all RFID devices in a single coupling between the RFID reader and the read structure.

17. A point of sale system, comprising:
a display having a plurality of objects disposed thereon, with each of the objects having an RFID device attached thereto; and
a read structure connected to a read structure coupler for operating in two separate modes;
wherein the RFID devices are read through one of the two separate modes and wherein an antenna of an RFID reader, in a near field mode of operation, can couple with the RFID device through the coupler and the read structure, and wherein the antenna of the RFID reader, in a far field mode of operation, can couple with the RFID device independent of the coupler and the read structure such that the RFID reader includes reader electronics and the RFID reader utilizes the antenna for both the near field and far field mode; and
wherein the RFID reader selects between the near field mode of operation and the far field mode of operation by periodically transmitting in each mode of operation and selecting the mode of operation with the lowest return loss and if the antenna of the RFID reader, when utilized in far field mode, has a return loss that exceeds a fixed level, the RFID reader may select the near field mode of operation;
wherein the RFID reader electronics communicate differently for near field and far field mode; and
wherein communication between the RFID reader and the read structures involves communicating information on all RFID devices in a single coupling between the RFID reader and the read structure.

* * * * *